United States Patent

[11] 3,627,843

[72] Inventors Gianfranco Pregaglia
Milan;
Alberto Andreetta; Luigi Benzoni, both of
Novara, all of Italy
[21] Appl. No. 712,624
[22] Filed Mar. 13, 1968
[45] Patented Dec. 14, 1971
[73] Assignee Montecatini Edison S.p.A.
Milan, Italy

[54] HYDROFORMYLATION OF PROPENE
2 Claims, No Drawings
[52] U.S. Cl. .................................................. 260/604 HF,
260/632 HF
[51] Int. Cl. .......................................................... C07c 45/08
[50] Field of Search ............................................. 260/604 HF

[56] References Cited
UNITED STATES PATENTS
| | | | |
|---|---|---|---|
| 3,239,569 | 3/1966 | Slaugh et al. ................. | 260/604 X |
| 2,834,812 | 5/1958 | Haughes et al. .............. | 260/604 |
| 2,820,059 | 1/1958 | Hasek et al. .................. | 260/604 |

*Primary Examiner*—Leon Zitver
*Assistant Examiner*—R. H. Liles
*Attorneys*—Curt M. Avery, Arthur E. Wilfond, Herbert L. Lerner and Daniel J. Tick

ABSTRACT: Described is an improved process for preparing butyric aldehydes by hydroformylation of propene in the presence of cobalt-carbonyls complexed with phosphines. The process is characterized in that a reaction medium is used chosen from among N.N-dialkyl-amides, tetra-alkyl-ureas, aliphatic nitriles and dinitriniles, containing from two to 12 carbon atoms. The operating temperatures are between 110° and 220° C. and the operating pressures of $CO+H_2$ are between 20 and 400 atmospheres.

HYDROFORMYLATION OF PROPENE

Our invention is concerned with the hydroformylation of propene. Various processes are known for obtaining $C_4$ aldehydes by hydroformylation of propene with CO and $H_2$ in the presence of simple of modified cobalt-carbonyls. Under these conditions, isobutyric aldehyde is obtained in addition to the main product n-butyric aldehyde, with the ratio of normal to branched aldehyde: 3–4/1. So far no processes for the synthesis of aldehydes with a normal to branched isomer ratio higher than 5:1 are known.

Oxo products with high linear to branched chain ratios have been obtained recently (French Pat. No. 1,345,933 to Shell Inter. Res. Mij.) by hydroformylation of propene. However, mixtures of $C_4$ aldehydes and alcohols are obtained. The selectivity in $C_4$ aldehydes is not very high because of the pronounced hydrogenating properties of the catalytic system used. On the other hand, as in the case of hydroformylation of propene to obtain $C_8$ alcohols, it is necessary to stop the hydroformylation at the stage of $C_4$ aldehyde formation, inasmuch as only these can be easily and effectively condensed in order to obtain alcohols with twice the number of carbon atoms. Therefore, the possibility of high selectivity hydroformylation of propene to n-butyric aldehyde constitutes a considerable advantage in the industrial production.

We have surprisingly found out that n-butyric aldehyde can be obtained in high selectivity by using a suitable reaction solvent. This solvent can be chosen from organic compounds having from two to 12 carbon atoms and containing —CN or

groups, such as NN-dialkyl-amides, tetra-alkyl-ureas, aliphatic nitriles and dinitriles. In particular, conveniently used solvents are dimethyl-formamide, dimethyl-acetamide, tetra-methyl-urea, acetonitrile, adipo-nitrile, etc. The $C_4$ aldehydes, obtained when operating in these solvents, have normal to iso ratios higher than 5.5/1 and are accompanied by only small quantities of alcohols.

The catalysts used are cobalt-carbonyls substituted by Lewis bases, preferably phosphines. Particularly favorable are trialkyphosphines with 2-8 C alkyls, e.g. triethylphosphine, tri-n-butylphosphine, etc.

Examples of cobalt-carbonylic complexes suited for the reaction are: $[Co(CO)_3P(n-C_4H_9)_3]_2$, $HCo(CO)_3[P(n-C_4H_9)_3]_2$, $HCo\ CO[P(n-C_4H_9)_3\ _3]_3$, $[Co(CO)_2P(n-C_4H_9)_3]_2$. The catalyst may be formed "in situ" by reacting soluble cobalt salts, phosphine and carbon monoxide. The quantity of catalyst used ranges between 5 and 200 milliatoms of cobalt per liter of solvent. In practice, concentrations of 60–890 milliatoms of cobalt per liter of solvent are preferred.

Temperatures between 110° and 220° C. are operable, but temperatures from 160° to 200° C. are preferred. The reaction pressure may vary from 20 to 400 atmospheres. In practice, it is preferred to operate at pressures comprised between 40 and 210 atmospheres and in particular between 90 and 120 atmospheres. The gaseous mixture fed contains CO and $H_2$ in a preferably molar ratio.

Although the mechanism of this reaction is not at all clear, it is possible that the solvents used in the present process substantially modify the structure of the introduced carbonylic complex. The table below gives the absorption wave numbers in the zone of the carbonyls as well as the intensities of the I.R. bands of the reaction solution and, for comparison, of other solutions obtained by operating under the same conditions (see example 3), but with different solvents:

| $\nu$ CO | 1,990 cm.$^{-1}$ | 1,950 cm.$^{-1}$ | 1,890 cm.$^{-1}$ |
|---|---|---|---|
| Dimethyl-formamide | Weak | None | Very strong |
| Methyl-isobutyl-ketone | Medium | Weak | Strong |
| n-Heptane | None | Very strong | None |

The 1890 cm.$^{-1}$ band thus constitutes a characteristic datum of the catalytic system using a solvent of this invention.

The following examples are given for purposes of illustration only and are not intended to limit the invention.

EXAMPLES 1

A rocking stainless steel autoclave of 200 cc. capacity, provided with a manometer, was accurately washed with pure nitrogen. Thereupon there were introduced:

| | |
|---|---|
| 2-ethylhexanoate of cobalt | 1.535 g. (4.45 mM.) |
| tri-n-butyl-phosphine | 1.09 g. (5.39 mM.) |
| dimethyl-formamide | 60 cc. |
| propene | 6.48 g. (154.3 mM.) |

On attaining 172° C. (pressure = 19 atm.) the $H_2$-CO mixture (1:1 by volume) was introduced until reaching a total pressure of 45 atmospheres. The absorption of the gas started at once. The total pressure was maintained between 45 and 40 atmospheres by feeding in new mixture. After 64 atmospheres of gas had been absorbed, the reaction was interrupted by cooling down the autoclave.

The gases discharged were carefully measured and gas-volumetrically analyzed in order to determine the content of propane and propene. The liquid was analyzed by gas-chromatography at 100°C., in order to determine the contents in $C_3$ hydrocarbons, $C_4$ alcohols, $C_4$ aldehydes and $C_4$ alkyl formates. An 8 meter column filled with di-isodecylphthalate on Chomosorb W(diatomaceous powder of 30–60 mesh of the Johns-Manville Corp.) was used for the gas chromatography. The $C_8$ compounds were determined at 160° C., by means of a 4 meter column filled with Carbowax 1540 (polyethyleneglycol of the Applied Science Laboratories Inc.).

The discharged products, liquid and gaseous, contained 76.1 mM. of propene, 6.93 mM. of propane, 59.8 mM. of $C_4$ aldehydes, 8.15 mM. of $C_4$ alcohols and 0.28 mM. of $C_4$ alkyl formates.

EXAMPLE 2

By operating according to the same procedure with the same amount of reactants as in example 1, but stopping each reaction about at 50–55 percent completion, three comparative tests were carried out in three different reaction mediums. The following table shows the dependence of selectivity of $C_4$ aldehydes on the reaction medium used in the hydroformylation of propane:

| 1 | 2 | 3 | 4 | 5 |
|---|---|---|---|---|
| Reaction medium | Time of reaction, min. | Selectivity in $C_4$ aldehydes, percent | Moles aldehydes/moles alcohols | Linear products/branched product |
| Dimethyl-formamide | 57 | 76.5 | 88/12 | 86.7/13.5 |
| Methyl-isobutyl-ketone | 18 | 66.7 | 76.1/23.9 | 86.7/13.3 |
| Toluene | 24 | 65.9 | 73.2/26.8 | 86.4/13.6 |
| n-Heptane | 27 | 58.3 | 63.6/36.4 | 85.9/14.1 |

The time of the reaction (column 2) expresses the minutes lapsed between the introduction of the $H_2$—CO mixture and the cooling of the autoclave. The selectively (column 3) represents the moles of $C_4$ aldehydes obtained from 100 moles of converted propene. The ratio between the linear and branched products (column 5) was calculated on the sum of alcohols + aldehydes.

Since the above tests differ only as to the reaction medium used, the table just evidences that the higher selectivity obtained in DMF (test of example 1) is due only to the use of that particular reaction medium.

EXAMPLE 3

A rocking stainless steel autoclave of 200 cc. capacity, provided with a manometer, was carefully washed with pure nitrogen. Thereupon were introduced:

| | |
|---|---|
| [Co(CO)₃P(nC₄H₉)₃]₂ | 2.525 g. (3.66 mM.) |
| P(n-C₄H₉)₃ | 1.785 g. (8.83 mM.) |
| HCO.N(CH₃)₂ | 100 cc. |
| propene | 10.6 g. (252.4 mM.) |

After feeding in the H₂—Co (1:1 by volume) mixture until attaining a total pressure of 68 atmospheres, the autoclave was heated up to 180° C. The absorption of gas started at about 160° C. The total pressure was maintained from 110 to 100 atmospheres by feeding in new mixture. After an hour, the absorption was almost complete and the autoclave was cooled down.

The discharge products, analyzed as described in example 1, contained 41 mM. of propene, 15.4 mM. of propane, 172 mM. of C₄ aldehydes, 18.26 mM. of C₄ alcohols and 1.71 mM. of C₄ alkyl formates.

Selectively in C₄ aldehydes = 81.3 percent
Moles aldehydes/moles alcohols = 90.4/9.6
Linear products/branched products = 89.1/10.9

EXAMPLE 4

Introduced into a 200 cc. autoclave, while operating according to the procedures described in example 1, were:

| | |
|---|---|
| [Co(CO)₃P(n-C₄H₉)₃]₂ | 2.53 g. (3.66 mM.) |
| tri-n-butyl-phosphine | 1.785 g. (8.85mM.) |
| NN-dimethyl-acetamide CH₃-CO-N(CH₃)₂ | 100 cc. |
| propene | 10.56 g. (251.4 mM.) |

After introducing a H₂-CO mixture (1:1 by volume) until a total pressure of 68 atmospheres was attained, the autoclave was heated up to 180° C. The absorption of gas started at about 162° C. The total pressure was maintained from 110 to 100 atmospheres by feeding in new mixture. After 34 minutes, the absorption had considerably dropped and the autoclave was cooled down.

The discharged products, analyzed as described in example 1, contained 41.3 mM. of propene, 18.9 mM. of propane, 160.8 mM. of C₄ aldehydes, 22.8 mM. of C₄ alcohols and 1.9 mM. of C₄ alkyl formates.

Selectivity in C₄ aldehydes = 76.5 percent
Moles aldehydes/moles alcohols = 87.6/12.4
Linear products/branched products = 89.2/10.8

EXAMPLE 5

The following were introduced into a 200 cc. autoclave, operating as described in example 1:

| | |
|---|---|
| [Co(CO)₃P(n-C₄H₉)₃]₂ | 2.53 g. (3.66 mM.) |
| tri-n-butyl-phosphine | 1.785 g. (8.85 mM.) |
| tetra-methyl-urea | 100 cc. |
| propene | 10.78 g. (256.6 mM.) |

After introducing sufficient H₂—CO mixture (1:1 by volume) to reach a total pressure of 90 atmospheres, the autoclave was heated up to 175° C. The absorption of the gas started at about 165° C. The total pressure was maintained at from 130 to 120 atmospheres by feeding in new mixture. After 32 minutes, the absorption had dropped considerably and the autoclave was cooled down.

The discharge products, analyzed as described in example 1, contained 32.3 mM. of propene, 14.7 mM. of propane, 176 mM. of C₄ aldehydes, 22.1 mM. of C₄ alcohols and 3.8 mM. of C₄ alkyl formates.

Selectivity in C₄ aldehydes = 78.4 percent
Moles aldehydes/moles alcohols = 88.8/11.2
Linear products/branched products = 89.5/10.5

EXAMPLE 6

The following were introduced into a 200 cc. autoclave, operating as described in example 1:

| | |
|---|---|
| [Co(CO)₃P(n-C₄H₉)₃]₂ | 2.53 g. (3.66 mM.) |
| P(n-C₄H₉)₃ | 1.785 g. (8.83 mM.) |
| CH₃-CN acetonitrile | 100 cc. |
| propene | 10.6 g. (252.4 mM.) |

After introducing sufficient H₂—CO mixture (1:1 by volume) to reach a total pressure of 138 atomspheres, the autoclave was heated to 180° C. The absorption of gas started at about 166° C. The total pressure was maintained at from 210 to 200 atmospheres by feeding in new mixture. After 56 minutes, the absorption had considerably dropped and the autoclave was cooled down.

The discharge products, analyzed as described in example 1, contained 40.84 mM. of propene, 16.3 mM. of propane, 174.3 mM. of C₄ aldehydes, 12.66 mM. of C₄ alcohols and 3.5 mM. of formates.

Selectivity in C₄ aldehydes = 82.4 percent
Moles/aldehydes alchols = 93.2/6.8
Linear products/branched products = 87.1/12.9

EXAMPLE 7

A 100 cc. capacity rocking stainless steel autoclave provided with a manometer was carefully washed with pure nitrogen. Thereupon were introduced:

| | |
|---|---|
| [Co(CO)₃P(n-C₄H₉)₃]₂ | 1.262 g. (1.83 mM.) |
| tri-n-butylphosphine | 0.894 g. (4.42 mM.) |
| propionitrile CH₃-CH₂CN | 50 cc. |
| propene | 5.32 g. (126.7 mM.) |

After having introduced into the autoclave sufficient H₂—CO mixture (1:1 by volume) to reach a total pressure of 133 atmospheres, the autoclave was heated up to 178° C. The absorption of gas started at about 158° C. The total pressure was maintained at between 210 and 200 atmospheres by feeding in new mixture. After 50 minutes, the autoclave was cooled down. The discharge product, analyzed according to the methods described in example 1, contained: 28 mM. of propene, 7.3 mM. of propane, 79.8 mM. of C₄ aldehydes, 6.2 mM. of C₄ alcohols and mM. mM of formates.

Selectively in C₄ aldehydes = 80.8 percent
Moles aldehydes/moles alcohols = 92.8/7.2
Linear products/branched products = 88.4/11.6

Obviously many modifications and variations of the invention, as hereinbefore set forth, may be made without departing from the spirit and scope thereof and only such limitations should be imposed as are indicated in the appended claims.

We claim:

1. A process for preparing butyric aldehydes by hydroformylation of propene in the presence of a cobalt-carbonyl complexed with a phosphine, which comprises carrying out the reaction in a reaction medium selected from the group consisting of N,N-dialkyl-amides of alkanoic acids, tetraalkylureas, and alkyl nitriles, containing from two to 12 carbon atoms, at a temperature of between 110° and 220° C. and at pressures of CO=H₂ between 20 atmospheres gauge and 400 atmospheres gauge.

2. The process of claim 1, wherein the reaction medium is dimethyl-formamide.

* * * * *